United States Patent
Avery et al.

(10) Patent No.: US 11,308,042 B2
(45) Date of Patent: *Apr. 19, 2022

(54) DETERMINING AVAILABLE REMOTE STORAGES IN A NETWORK TO USE TO REPLICATE A FILE BASED ON A GEOGRAPHICAL REQUIREMENT WITH RESPECT TO THE FILE

(71) Applicant: International Business Machines Corporation, Armonk, NY (US)

(72) Inventors: Kenytt D. Avery, Newport Beach, CA (US); Edward L. Bader, Los Angeles, CA (US); Patricia V. Gatewood, Arcadia, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/404,620

(22) Filed: May 6, 2019

(65) Prior Publication Data

US 2019/0258611 A1    Aug. 22, 2019

Related U.S. Application Data

(63) Continuation of application No. 15/805,030, filed on Nov. 6, 2017, now Pat. No. 10,795,867.

(51) Int. Cl.
*G06F 17/30* (2006.01)
*G06F 16/182* (2019.01)

(52) U.S. Cl.
CPC .............................. *G06F 16/1844* (2019.01)

(58) Field of Classification Search
CPC ...... G06F 16/1844; G06F 16/23; G06F 16/27; G06F 16/275; G06F 16/178
See application file for complete search history.

(56) References Cited

U.S. PATENT DOCUMENTS 5,675,802 A * 10/1997 Allen ..................... G06F 8/71
707/999.203
6,047,070 A    4/2000 Raaf
(Continued)

FOREIGN PATENT DOCUMENTS

EP          0794646 A2 * 10/1997
EP          2667564    * 11/2013
(Continued)

OTHER PUBLICATIONS

Cuenca-Acuna et al., Autonomous Replication for High Availability in Unstructured P2P Systems. IEEE 2003.*
(Continued)

*Primary Examiner* — Daniel A Kuddus
(74) *Attorney, Agent, or Firm* — Konrad, Raynes, Davda & Victor LLP; David W. Victor; Alan S. Raynes

(57) ABSTRACT

Provided are a computer program product, system, and method for determining available remote storages in a network to use to replicate a file based on a geographical requirement with respect the file. A determination is made as whether available remote storages satisfy constraints associated with a document class of the file. The constraints include a geographical location at which to replicate the file and a minimum number of replications to create for the file. At least one remote storage of the available remote storages is selected that satisfies the constraints to store at least one copy of the file. The file is replicated to the selected at least one remote storage.

12 Claims, 6 Drawing Sheets

| File ID | Origination Location | Document Class | Replication Type (synchronous or asynchronous) | Repository | Repository Locations |
|---|---|---|---|---|---|
| 202 | 204 | 206 | 208 | 210 | 212 |

File Metadata

(56) References Cited

U.S. PATENT DOCUMENTS

| | | | |
|---|---|---|---|
| 6,063,856 | A | 5/2000 | Mass |
| 6,138,073 | A | 10/2000 | Uchigaki |
| 6,144,999 | A | 11/2000 | Khalidi et al. |
| 6,389,402 | B1 | 5/2002 | Ginter et al. |
| 6,763,436 | B2 | 7/2004 | Gabber et al. |
| 6,987,762 | B2 | 1/2006 | Shiota |
| 7,519,785 | B1 | 4/2009 | Schultz et al. |
| 7,778,183 | B2 * | 8/2010 | Fan .................. H04Q 3/0079 370/254 |
| 7,827,608 | B2 | 11/2010 | Bird et al. |
| 8,074,107 | B2 | 12/2011 | Sivasubramanian et al. |
| 8,346,721 | B2 * | 1/2013 | Acedo .................. G06F 3/065 707/610 |
| 8,612,682 | B2 * | 12/2013 | Jaquette .............. G06F 16/185 711/117 |
| 8,730,495 | B2 | 5/2014 | Mihira |
| 8,856,101 | B2 | 10/2014 | Pigeon |
| 8,949,558 | B2 * | 2/2015 | Castillo ................ G06F 16/00 711/162 |
| 8,966,027 | B1 | 2/2015 | Brandwine et al. |
| 9,575,848 | B2 | 2/2017 | Goodman et al. |
| 9,635,109 | B2 | 4/2017 | Iliadis et al. |
| 9,697,083 | B2 | 7/2017 | Anglin et al. |
| 2007/0168405 | A1 | 7/2007 | Pomerantz |
| 2008/0040322 | A1 | 2/2008 | Rucker et al. |
| 2008/0183891 | A1 | 7/2008 | Ni et al. |
| 2008/0198397 | A1 | 8/2008 | Watanabe |
| 2008/0198752 | A1 * | 8/2008 | Fan .................. H04Q 3/0079 370/238 |
| 2009/0125569 | A1 * | 5/2009 | Achtermann ......... G06F 16/184 |
| 2009/0241061 | A1 | 9/2009 | Asai et al. |
| 2009/0307166 | A1 * | 12/2009 | Routray .................. G06N 5/04 706/46 |
| 2011/0016082 | A1 * | 1/2011 | Acedo .................. G06F 3/0605 707/610 |
| 2011/0196833 | A1 | 8/2011 | Drobychev et al. |
| 2011/0225121 | A1 * | 9/2011 | Cooper ................ G06F 16/273 707/634 |
| 2012/0079223 | A1 | 3/2012 | Jaquette |
| 2012/0278578 | A1 * | 11/2012 | Castillo .................. G06F 16/00 711/E12.002 |
| 2013/0325804 | A1 * | 12/2013 | Bachar ................ G06F 16/162 707/634 |
| 2014/0006357 | A1 | 1/2014 | Davis et al. |
| 2014/0006465 | A1 | 1/2014 | Davis et al. |
| 2015/0269239 | A1 | 9/2015 | Swift et al. |
| 2016/0034492 | A1 | 2/2016 | Harrison et al. |
| 2016/0147608 | A1 * | 5/2016 | Anglin ................ G06F 11/1451 711/162 |
| 2016/0147854 | A1 | 5/2016 | Abrahams et al. |

FOREIGN PATENT DOCUMENTS

| | | |
|---|---|---|
| EP | 2667564 A1 | 11/2013 |
| EP | 2738709 A1 | 6/2014 |
| EP | 2816774 A1 | 12/2014 |

OTHER PUBLICATIONS

Response to Final Office Action, dated May 5, 2020, for U.S. Appl. No. 15/805,030 (54.147), filed Nov. 6, 2017, invented by Kenytt D. Avery et al., Total 11 pages.

Notice of Allowance, dated May 28, 2020, for U.S. Appl. No. 15/805,030 (54.147), filed Nov. 6, 2017, invented by Kenytt D. Avery et al., Total 14 pages.

H. Yoon et al., "Attribute-Based Partial Geo-Replication System", dated 2016, IEEE, Total 4 pages.

Wikipedia, "Enterprise Content Management", (online) retrieved on Oct. 4, 2017 from the Internet at URL>https://en.wikipedia.org/wiki/Enterprise_content_management, Total 10 pages.

US Patent Application, dated Nov. 6, 2017, for U.S. Appl. No. 15/805,030 (54.147), filed Nov. 6, 2017, invented by Kenytt D. Avery at al, Total 32 pages.

Preliminary Amendment, dated May 6, 2019, for U.S. Appl. No. 15/805,030 (54.147), filed Nov. 6, 2017, invented by Kenytt D. Avery et al., Total 8 pages.

List of IBM Patents or Patent Applications Treated as Related, pp. 2, dated May 6, 2019.

Response to Office Action, dated Dec. 19, 2019, for U.S. Appl. No. 15/805,030 (54.147), filed Nov. 6, 2017, invented by Kenytt D. Avery et al., Total 14 pages.

Final Office Action1, dated Mar. 4, 2020, for U.S. Appl. No. 15/805,030 (54.147), filed Nov. 6, 2017, invented by Kenytt D. Avery et al., Total 18 pages.

Office Action, dated Sep. 19, 2019, for U.S. Appl. No. 15/805,030 (54.147), filed Nov. 6, 2017, invented by Kenytt D. Avery et al., Total 24 pages.

* cited by examiner

File Metadata

Storage Metadata

Constraint

Replication Queue Entry

DETERMINING AVAILABLE REMOTE STORAGES IN A NETWORK TO USE TO REPLICATE A FILE BASED ON A GEOGRAPHICAL REQUIREMENT WITH RESPECT TO THE FILE

BACKGROUND OF THE INVENTION

1. Field of the Invention

The present invention relates to a computer program product, system, and method for determining available remote storages in a network to use to replicate a file based on a geographical requirement with respect the file.

2. Description of the Related Art

An Enterprise Content Management (ECM) system manages the storage, preservation, archival, replication, synchronization, and life cycle of documents according to organizational processes. An ECM system may manage multiple replicas of a document in different locations for the purposes of availability, disaster recovery, and performance. These replicas may be distributed across multiple geographies in order to increase the resilience of the system to failure. In fact, a system with strong disaster recovery requirements may enforce such remote geographical distributions as a requirement, for example requiring that replicas of a document be stored in at least two different locations, such as different nations, states, etc.

There is a need in the art for improved techniques to replicate documents across different geographical locations and boundaries according to enterprise needs.

SUMMARY

A first embodiment comprises a computer program product, system, and method for replicating a file to a remote storage. Provided are a computer program product, system, and method for determining available remote storages in a network to use to replicate a file based on a geographical requirement with respect the file. A determination is made as whether available remote storages satisfy constraints associated with a document class of the file. The constraints include a geographical location at which to replicate the file and a minimum number of replications to create for the file. At least one remote storage of the available remote storages is selected that satisfies the constraints to store at least one copy of the file. The file is replicated to the selected at least one remote storage Described embodiments provide constraints to replicating a file including a geographical location to address restrictions on where a file may be replicated based on a document class of the file, such as if the file has Personally Identifiable Information (PII) or Sensitive Personal Information (SPI). These geographical location may be imposed by national law to prevent transfer of certain sensitive file data beyond a national boundary. Described embodiments provide improvements to replication technologies to automatically manage the replication to satisfy the geographic location and at the same time also satisfy replication requirements that specify a minimum number of replications that must be made within the geographical locations dictated by the geographical restrictions.

In a second embodiment, the first embodiment may further include determining whether the available remote storages satisfy the constraints determines whether one of the available remote storages satisfies a location requirement with respect to where the file was created With the second embodiment, the geographical location requirement may consider the location of where the file was created to determine the geographical restriction. This ensures that files are not moved to a restricted geographical location with respect to where they were created, because the geographical location may restrict files having sensitive data, such as PII and SPI, from being transferred beyond the location from where they were created, such as a national or jurisdictional boundary.

In a third embodiment, the second embodiment may further include that the determining whether the available remote storages satisfy the constraints comprises determining whether there are the minimum number of replications within the geographical location of where the file was created.

With the third embodiment, the determination is made of multiple remote storages that comprise the minimum number of remote storages to store the minimum number of copies of the file to satisfy the replication requirement such that these minimum number of remote storages must also satisfy the geographical location requirement that the remote storages are within the geographical location of where the file was created. With this third embodiment, replication complies with any geographic location restrictions imposed by legal authorities to prevent transfer of the file beyond a location requirement and at the same time the file is assured to perform a minimum number of replications so the file is sufficiently protected at different locations.

In a fourth embodiment, the first embodiment may further include determining whether there is at least one available remote storage that satisfies the geographical location in response to determining that the available remote storages do not satisfy the constraints. The file is replicated to the at least one available remote storage that satisfies the geographical location in response to determining that the available remote storages do not satisfy the constraints.

With the fourth embodiment, if there are not the minimum number of remote storages satisfying the geographical location requirement, then the file is replicated to the available remote storages that satisfy the geographical location requirement to allow for some replication even if the replication requirement is not satisfied. This provides for some level of replication to be performed to provide some level of protection of the file even if the minimum number of replications cannot be satisfied.

In a fifth embodiment, the fourth embodiment may further include that in response to determining that there is the at least one available remote storage that satisfies the geographical location when the constraints are not satisfied, determining a remaining number of replications comprising the minimum number of replications minus a number of the at least one available remote storage to which the file is replicated. The file is indicated in a replication queue to replicate the file to at least one remote storage that becomes available that satisfies the geographical location until the remaining number of replications of the file is performed.

With the fifth embodiment, if there are not the minimum number of available remote storages that satisfy the geographical location requirement, then a remaining number of replications is determined of the replications that could not complete. Indication is made in a replication queue of these remaining number of replications to perform for the file so as remote storages that satisfy the geographic requirement become available, the queued replications can be performed until the minimum number of replications are performed to satisfy the replication requirement. This allows for as much replication as possible to be performed that satisfies any geographical requirements, which may comprise legal requirements that must be met, and then allow for the remaining replications to be performed as remote storages become available that satisfies the geographical requirements.

In a sixth embodiment, the fifth embodiment may further include initiating a configuration of a remote storage that satisfies the geographical location to make available to replicate the file indicated in the replication queue.

With the sixth embodiment, if there are not the minimum number of available remote storages, then remote storages may be automatically configured to satisfy the geographical location requirement so these configured remote storages may be used to replicate for the queued remaining number of replications in the replication queue. In this way, replication is made to the maximum sites possible that satisfy the geographical location and additional remote storages are automatically configured that satisfy the geographical location requirement to allow the replication requirement to be completed without user involvement.

DETAILED DESCRIPTION

Figure 1:
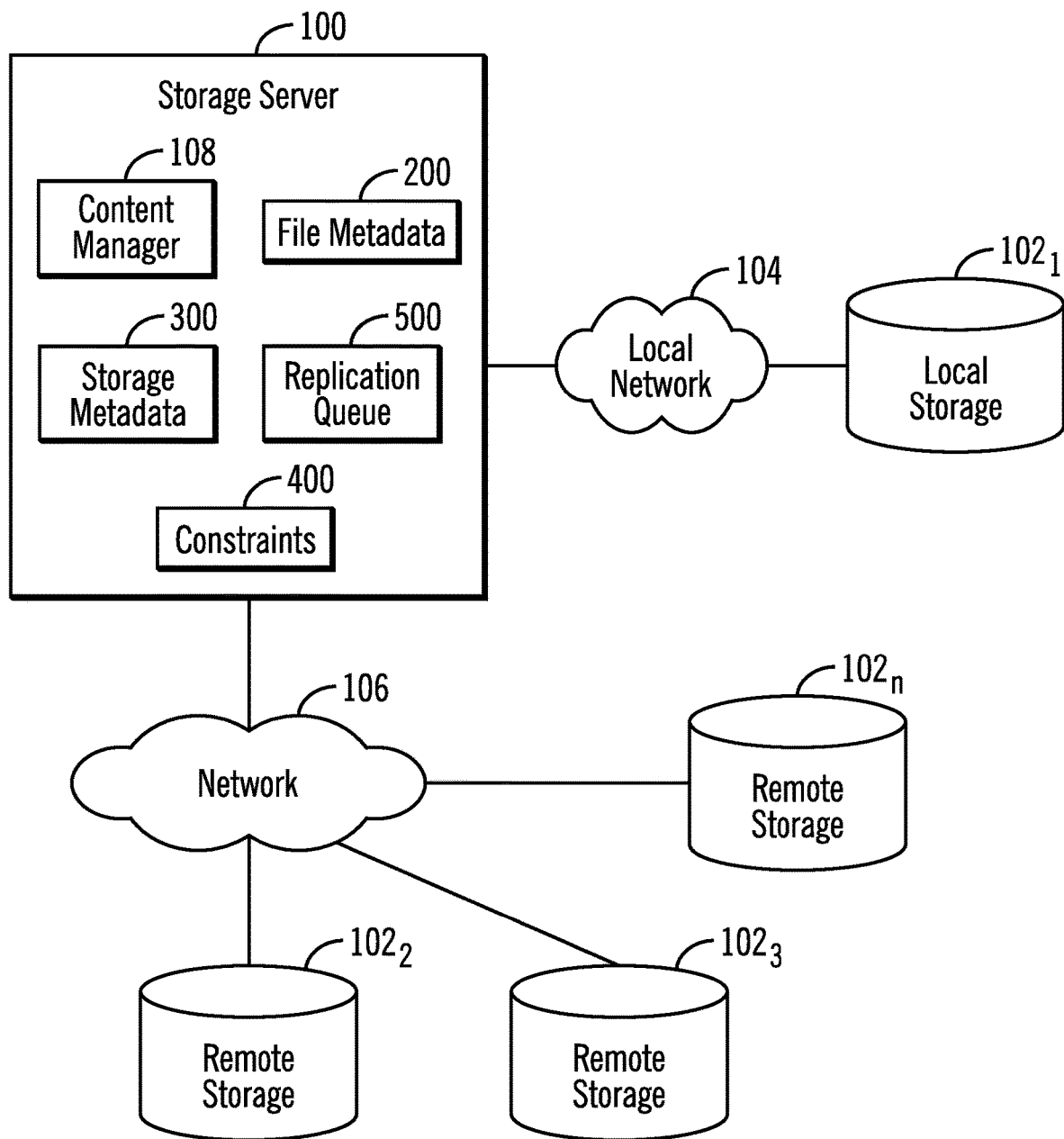
FIG. 1 illustrates an embodiment of a network storage environment.

When replicating documents in an enterprise system, different regulations and laws may apply with respect to handling data such as Personally Identifiable Information (PII) or Sensitive Personal Information (SPI). While some documents can be replicated anywhere, other documents may not be allowed to be legally stored in or exported to another geography, such as another country. Thus, there is a need to limit the available locations of document replicas to meet security, regulatory, and company guidelines.

Described embodiments provide improvements to file replication technologies to automatically manage the replication of data across geographical locations to manage geographic requirements, such as restrictions or limits on where a file may be replicated. Whenever a document is uploaded or updated in a system, described embodiments apply constraints including geographical and replication requirements, where a geographical requirement provides a requirement with respect to a geographical location at which to replicate the file and the replication requirement provides a minimum number of replications to create for the file.

When processing a file to replicate, the content manager determines whether available remote storages in the network satisfy constraints associated with a document class of the file. The available remote storages that satisfy the geographical and the replication requirements are selected to use to replicate the file. However, if the minimum number of remote storages that satisfy a geographical requirement, such as a boundary limitation on where a file may be replicated based on where the file was created, are not available for replication, then the content manager will automatically take corrective action, such as fail the replication, perform as many of the required replications as possible, and configure additional remote storages satisfying the geographical requirement to use to complete the required replications.

Described embodiments improve computer technology for replicating files in an enterprise or network storage environment by having the content manager automatically determine and select available remote storages that satisfy the geographical requirements, such as boundary restrictions, based on a document class of the file to replicate and constraints associated with the document class. Further, described embodiments provide techniques for handling situations where there are not enough available remote storages that satisfy geographical limitations for replication, such as by queuing replication operations until remote storages satisfying geographical limitations become available and creating additional remote storages at geographical locations satisfying the geographical limitations.

Described embodiments also provide improved computer data structures to improve the management of replication operations with geographical and replication constraints, including file metadata specifying a document class used to determine the replication constraints for that document class that provides the geographical and replication requirements to use for files of that document class. Described embodiments further provide a replication queue data structure to queue files for which replication could not be completed due to a lack of available remote storages that satisfy the geographical constraints for a document class of the file, where the replication queue is used to select replications to complete when new remote storages become available.

FIG. 1 illustrates an embodiment of a data storage environment having a storage server 100 at which files may be uploaded and created. The storage server 100 is coupled to a local storage $102_1$ over a local network 104 and various remote storages $102_2 \ldots 102n$ over a network 106, such as a Wide Area Network (WAN). The remote storages $102_2 \ldots 102n$ may be may be at disparate geographical locations, such as within different jurisdictions, countries, etc.

In the event of a failure at the local storage $102_1$, a failover may occur to one of the remote storages $102_2 \ldots 102n$, which then operates as the failover primary site.

The storage server 100 includes a content manager 108 to manage the storage, replication, life cycle, and synchronization of files at remote storages $102_2 \ldots 102n$. The content manager 108 maintains file metadata 200 providing metadata for each file. The content manager 108 may replicate files in filsets or objects in the remote storages $102_2 \ldots 102_n$. The content manager 108 maintains storage metadata 300 having information on remote storages $102_2 \ldots 102_n$ in the network 106. The content manager 108 further maintains constraints 400 having information on replication requirements, including geographical requirements and replication number requirements, for different classes of documents. The content manager 108 further maintains a replication queue 500 to queue files asynchronously replicated whose replication did not complete due to a lack of available remote storages $102_2 \ldots 102_n$ satisfying geographical requirements.

The constraints 400 may include a geographical requirement that indicates, for certain types of data, geographical restrictions on where the file can be replicated. For instance, if the file includes personally identifiable information (PII) or sensitive personal information (SPI), a geographical requirement may restrict the sensitive data from being replicated to certain restricted geographical locations with respect to the location where the file was created or to be limited to being stored within a national or jurisdictional boundary geographical location. For instance, PII, SPI or information including security sensitive data may not be exported or replicated outside of a national boundary of where the file was created.

The content manager 108 may comprise an Enterprise Content Management (ECM) platform or program, and be implemented as standalone software program on the server 100 or as software as a service (SaaS), wherein the content manager 108 is offered as a service, such as a cloud based service.

The storages $102_1, 102_2 \ldots 102_n$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Data in the storages $102_1, 102_2 \ldots 102_n$ 4 may further be configured from an array of devices, such as Just a Bunch of Disks (JBOD), Direct Access Storage Device (DASD), Redundant Array of Independent Disks (RAID) array, virtualization device, etc. Further, the storages $102_1, 102_2 \ldots 102_n$ may comprise heterogeneous storage devices from different vendors and different types of storage devices, such as a first type of storage devices, e.g., hard disk drives, that have a slower data transfer rate than a second type of storage devices, e.g., SSDs.

The networks 104 and 106 may comprise one or more networks including Local Area Networks (LAN), Storage Area Networks (SAN), Wide Area Network (WAN), peer-to-peer network, wireless network, the Internet, etc.

Figure 2:
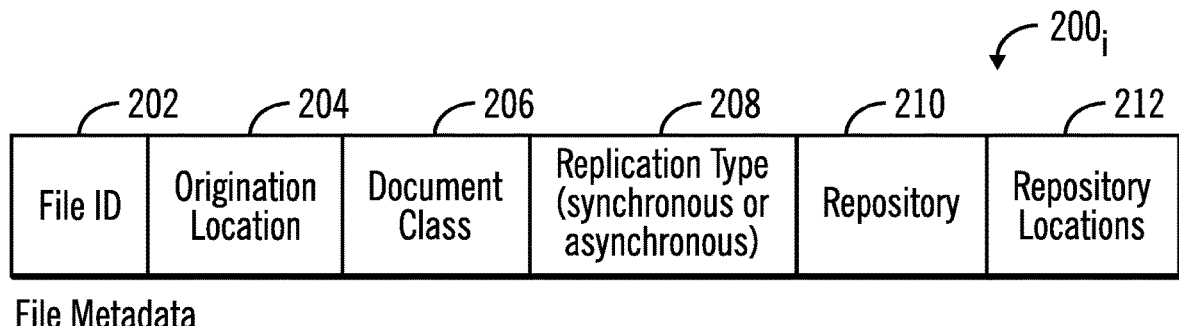
FIG. 2 illustrates an embodiment of file metadata.

FIG. 2 illustrates an instance of file metadata $200_i$ for a file including a unique file identifier 202, such as a file name; an origination location 204 indicating where the file 202 was created; a document class 206 of data maintained in the file 202, such as sensitive, e.g., PII, SPI, security, military, etc.; a replication type 208 for the file, such as synchronous or asynchronous; a repository 210 identifying storages in which the file may be replicated; and repository location 212 indicating locations in the remote storages $102_2 \ldots 102n$ in which the file was replicated.

Figure 3:
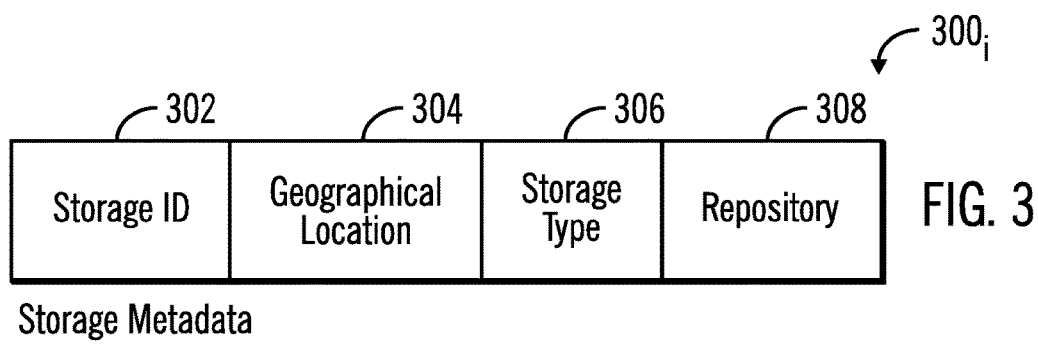
FIG. 3 illustrates an embodiment of storage metadata.

FIG. 3 illustrates an embodiment of an instance of storage metadata $300_i$ maintained for a storage in the environment, such as one of the remote storages $102_2 \ldots 102n$, and includes a storage identifier 302, such as a network address; a geographical location 304, such as a description or Global Positioning System (GPS) location; a storage type 306 indicating how file data is stored, such as in file sets or swift objects; and a repository 308 with which the remote storage 302 is associated.

Figure 4:
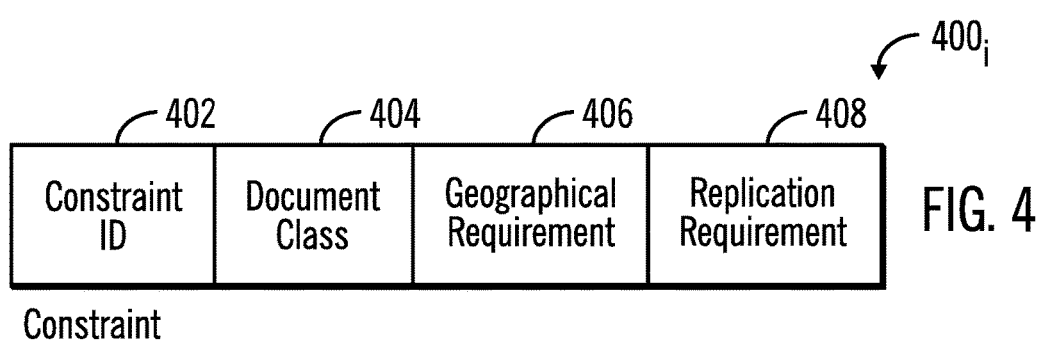
FIG. 4 illustrates an embodiment of constraints.

FIG. 4 illustrates an embodiment of an instance of a constraint $400_i$ providing geographical and replication requirements for a document class, and includes a constraint identifier 402; a document class 404 with which the constraint is associated, such as a particular type of sensitive data, etc.; a geographical requirement 406 indicating a geographical restriction or requirement with respect to the file; and a replication requirement 408, such as a minimum number of replications 408 that must be created for files of the document class 404.

The geographical requirement 406 may provide a geographical restriction based on an attribute of a file, such as providing a geographical boundary beyond which the file cannot be replicated based on its origination location 204, i.e., where it was created. For instance, personally sensitive data, such as PII or SPI, may not be replicated to certain countries or must be kept within the country within which it was generated. A geographical requirement 406 may also specify a minimum or maximum distance between the remote storages $102_2 \ldots 102_n$ to which the file is replicated, so that the file is stored at locations that will likely not be impacted by a disaster at another location at which the file is replicated.

Figure 5:
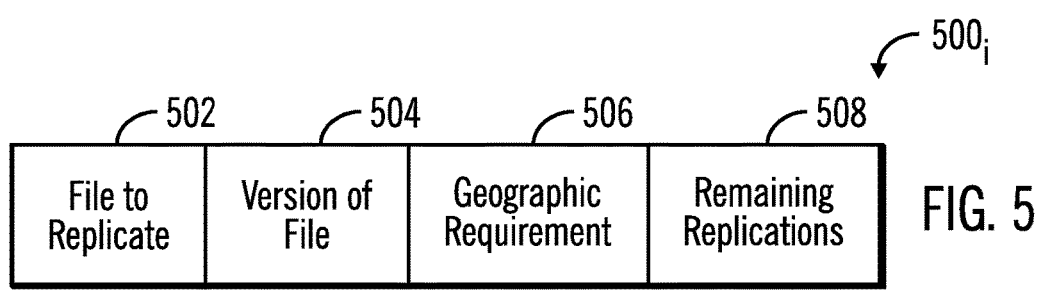
FIG. 5 illustrates an embodiment of a replication queue entry.

FIG. 5 illustrates an embodiment of a replication queue entry $500_i$ in the replication queue 500 for a file subject to asynchronous replication that has not completed, and indicates a file to replicate 502; a version of the file 504, such as time last modified; a geographic requirement 506 with respect to the replication, such as the file cannot be replicated to a location outside the nation or jurisdiction of where the file was created; and remaining replications 508 that must be performed to satisfy a replication requirement 508 associated with the file.

For synchronous replication, the replication will only succeed if the file is replicated to all remote storage locations that satisfy the constraints that apply to the file, and will fail if there are not enough remote storages available for immediate replication that satisfy the geographical and replication requirements. For asynchronous replication, the replication can proceed to partially replicate to only those remote storages satisfying the geographic and replication requirements that are available, and then be queued in the replication queue 500 to complete remaining replications at a later time, i.e., asynchronously, as remote storages become available that satisfy the geographical requirement 506 which previously could not be satisfied at the time of initial replication.

Figure 6A:
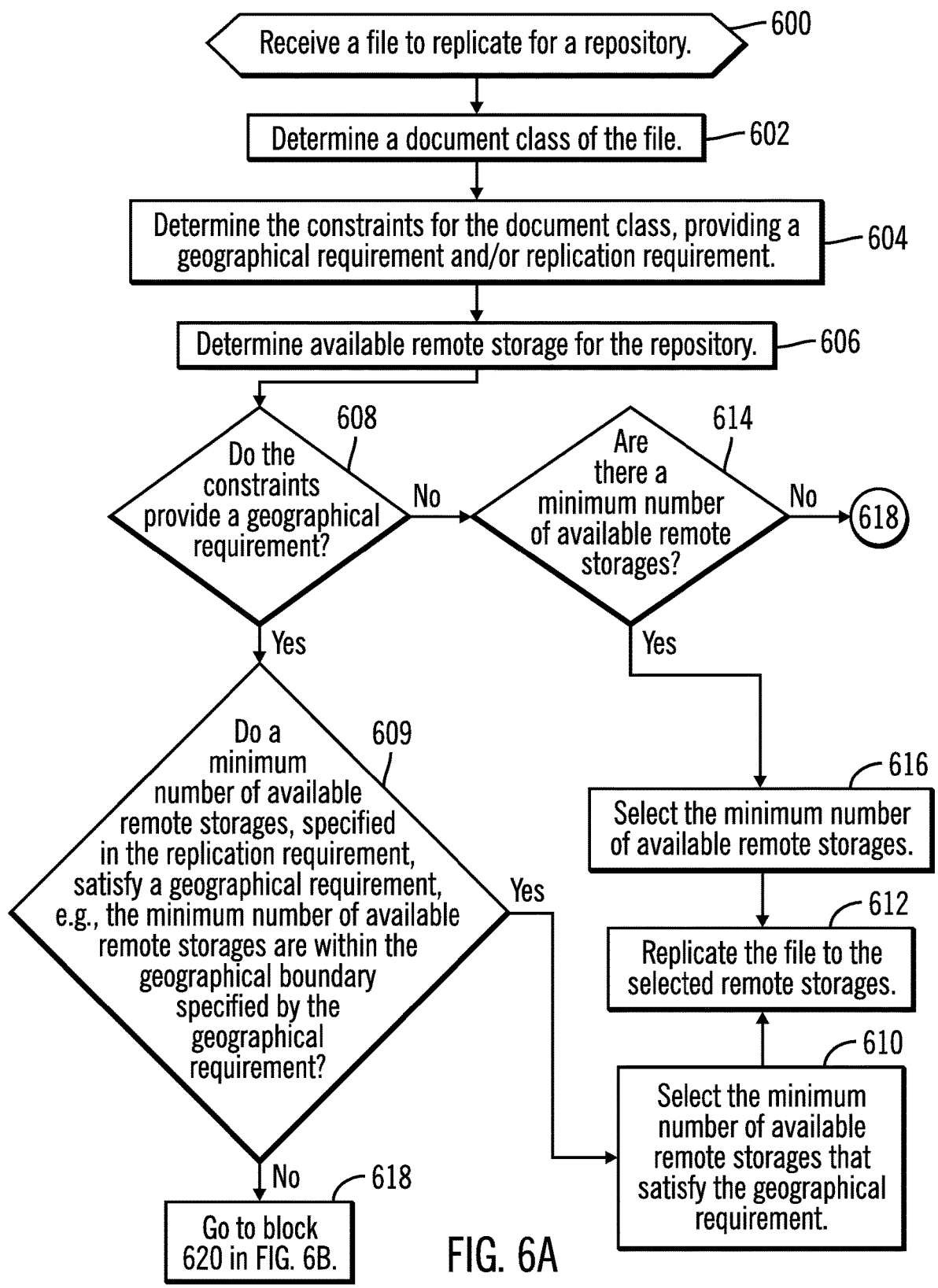
FIGS. 6a and 6b illustrate an embodiment of operations to replicate a file based on geographical and replication requirements.
Figure 6B:
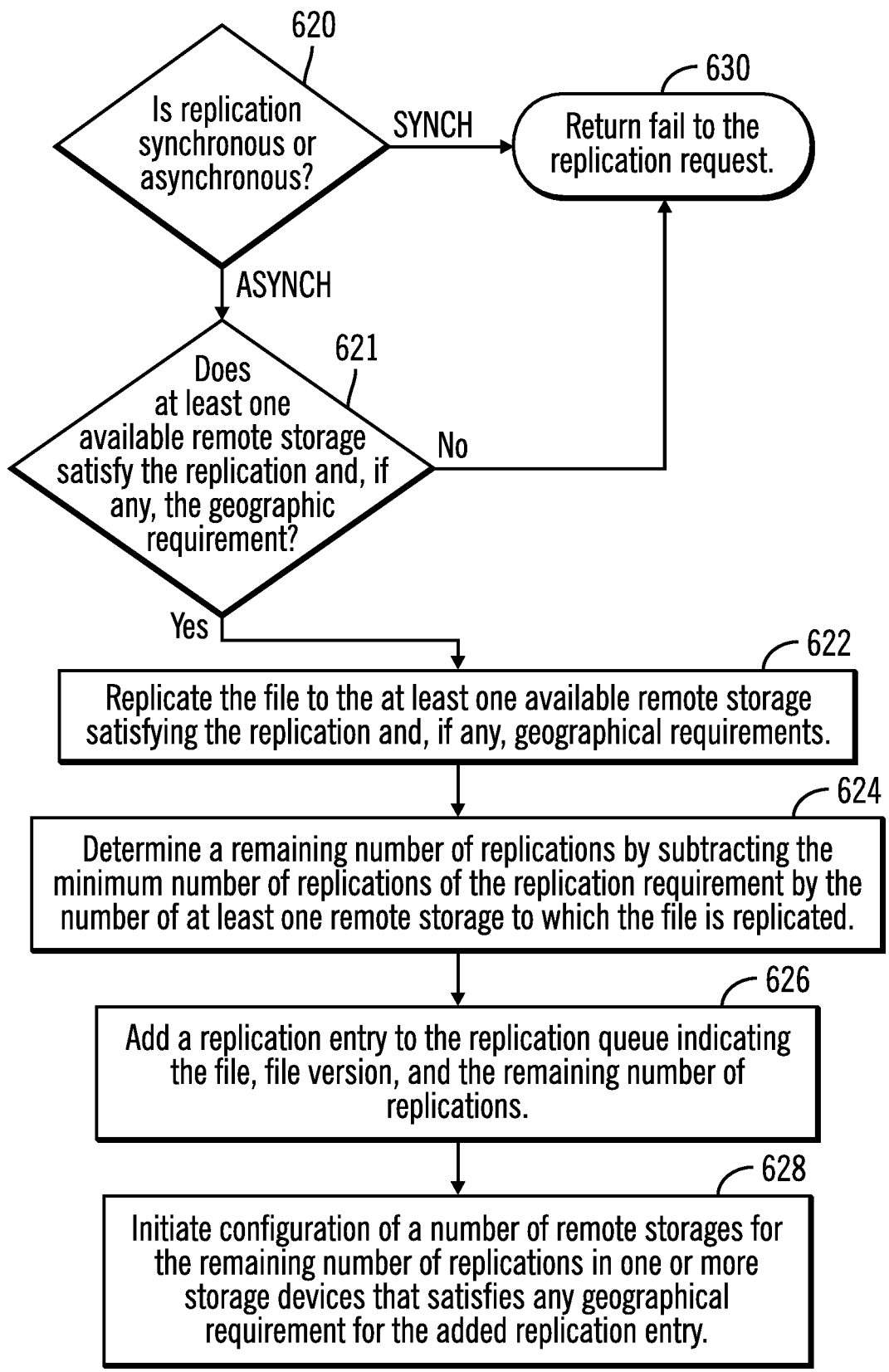

FIGS. 6a and 6b illustrate an embodiment of operations performed by the content manager 108 to replicate a file. Upon receiving (at block 600) a file to replicate, the content manager 108 determines (at block 602) a document class 206 for the file. The document class 206 may be specified by a user uploading the file to replicate or determined by scanning metadata or content in the file. The constraints $104_i$ for the file are determined (at block 604), such as by determining the constraints $104_i$ having a document class 404 matching the document class 206 of the file The content manager 108 then determines (at block 606) available remote storages $102_2 \ldots 102_n$ associated with a repository 308 matching the repository 210 used for replicas for the file $200_i$.

If (at block 608) the determined constraints $400_i$ include a geographical requirement 406, then the content manager 108 determines (at block 609) whether a minimum number of available remote storages $102_2 \ldots 102_n$, specified in the replication requirement 408 satisfy a geographical requirement, e.g., the minimum number of available storage devices are within the geographical boundary specified by the geographical requirement, such as within a boundary including the origination location 204 of the file. If the minimum number of available remote storages $102_2 \ldots 102_n$ satisfy the geographical requirement 406, then the content manager 108 selects (at block 612) the minimum number of available storage devices that satisfy the geographical requirement 406 and replicates (at block 612) the file to the selected remote storages $102_2 \ldots 102_n$.

If (at block 608) there is no geographical requirement 406 in the constraints $400_i$, then the content manager 108 determines (at block 614) whether there are a minimum number of available remote storages, as specified in the replication requirement 408. If so, then the minimum number of available remote storages $102_2 \ldots 102_n$ are selected (at block 616) and the file is replicated (at block 612) to the selected remote storages $102_2 \ldots 102_n$. If (at block 609 or 614) there are not a minimum number of available remote storages $102_2 \ldots 102_n$ satisfying the replication requirement 408 and any geographical requirement 406, then control proceeds (at block 618) to block 620 in FIG. 6b where the content manager 108 determines whether the replication type 208 for the file is synchronous or asynchronous.

If (at block 620) the replication type 208 is asynchronous, then the content manager 108 determines (at block 621) whether at least one available remote storage $102_2 \ldots 102_n$ satisfies the replication 408 and any geographical 406 requirements. If (at block 620) there is at least one available remote storage $102_2 \ldots 102_n$ satisfying the constraints, then the content manager 108 replicates (at block 622) the file to the at least one available remote storage satisfying the replication 408 and geographical 406 requirements, if any. The content manager 108 determines (at block 624) a remaining number of replications by subtracting the minimum number of replications of the replication requirement 408 by the number of at least one remote storage to which the file is replicated. A replication queue entry $500_i$ is added (at block 626) to the replication queue 500 indicating the file 502, file version 504, any geographical requirements 406 for the file, and the determined remaining replications 508, determined at step 624. The content manager 108 may then initiate (at block 628) configuration of a number of one or more remote storages for the remaining number of replications 508 in one or more storage devices at geographical locations that satisfy any geographical requirement 506 for the added replication queue entry $500_i$. A remote storage may be configured in one or more physical or virtual storage devices.

With the embodiments of FIGS. 6a and 6b, the constraints for replicating a file are determined based on file metadata or user input at the time of upload. The content manager 108 may then select available remote storages $102_2 \ldots 102_n$ that satisfy a replication requirement of a minimum number of replication sites and a geographical requirement indicating geographical limitations for replicating the file. The file may then be automatically replicated to remote storages $102_2 \ldots 102_n$ when writing the file to the local storage $102_1$ in a manner consistent with the replication requirements based on a document class 206 of the file, such as a type of data in the file. In this way, the user is not involved in determining the appropriate locations at which the file may be replicated which are automatically determined based on constraints defined for the document class of the file data. Further, in described embodiments, for asynchronous replication, if there are not a sufficient number of available remote storages $102_2 \ldots 102_n$ that satisfy replication and any geographical requirements at the time of replication, then the content manager 108 may automatically configure remote storage locations needed to complete the replication that also satisfy any geographical requirements of the constraints $400_i$ for the document class 206 of the file.

Figure 7:
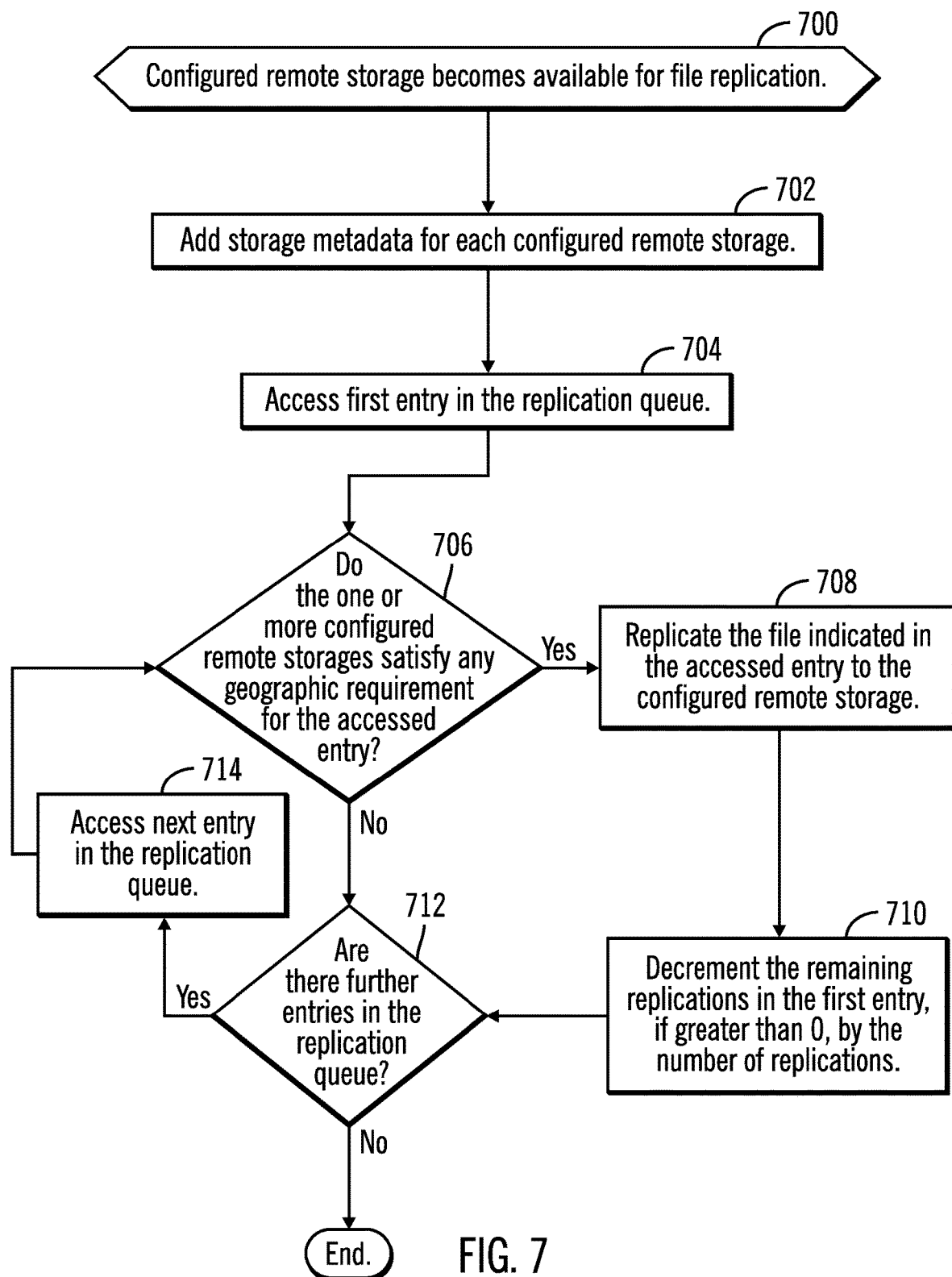
FIG. 7 illustrates an embodiment of operations to utilize a configured remote storage to complete queued file replications.

FIG. 7 illustrates an embodiment of operations performed by the content manager 108 or other component after configuring one or more new remote storage $102_N$ initiated at block 628 in FIG. 6b when there were not enough available remote storages $102_2 \ldots 102_n$ for the current replication. In response to completing (at block 700) configuring one or more new remote storages $102_N$ throughout the network 106, the content manager 108 adds (at block 702) storage metadata $300_i$ for each configured remote storage $102_N$ indicating the storage ID 302, e.g., network address, geographical location 304 of the physical location of the remote storage, a storage type 306, such as filesets, object storage, etc.; and a repository 308, which may comprise the repository 210 for the file for which the remote storage $102_C$ was configured to replicate. The first entry $500_1$ in the replication queue 500 is accessed (at block 704). If (at block 706) the one or more configured remote storages $102_C$ satisfy any geographic requirement 506, then the content manager 108 replicates (at block 708) the file 502 indicated in the entry $500_i$ to one or more configured remote storages $102_C$ to complete as many replications as possible indicated in the remaining replications 508. The remaining replications 508 is decremented (at block 710) by the number of replications performed at block 708, if the remaining replications 508 is greater than zero. After decrementing the remaining replications (at block 710) or if (at block 706) there are no configured remote storages $102_C$ that satisfy the geographic requirements 506 in the replication queue entry $500_i$, the content manager 108 determines whether (at block 712) there are further entries $500_{i+1}$ in the replication queue 500 following the currently accessed entry $500_i$. If so, then the next entry $500_{i+1}$ in the replication queue 500 is accessed and control proceeds back to block 706 to determine if the new configured remote storages $102_C$ can be used to complete queued replications. Otherwise, control ends until further remote storages are configured or become available.

With the operations of FIG. 7, once a new remote storage is configured or a previously configured storage that was unavailable becomes available, that now available remote storage can be used to complete queued asynchronous replications that did not complete if the new configured remote storage satisfies any geographic requirement 406 of the queued file for replication. This allows automatic configuration and selection for remote storages to meet replication requirements without requiring user involvement.

The reference characters used herein, such as i, n are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
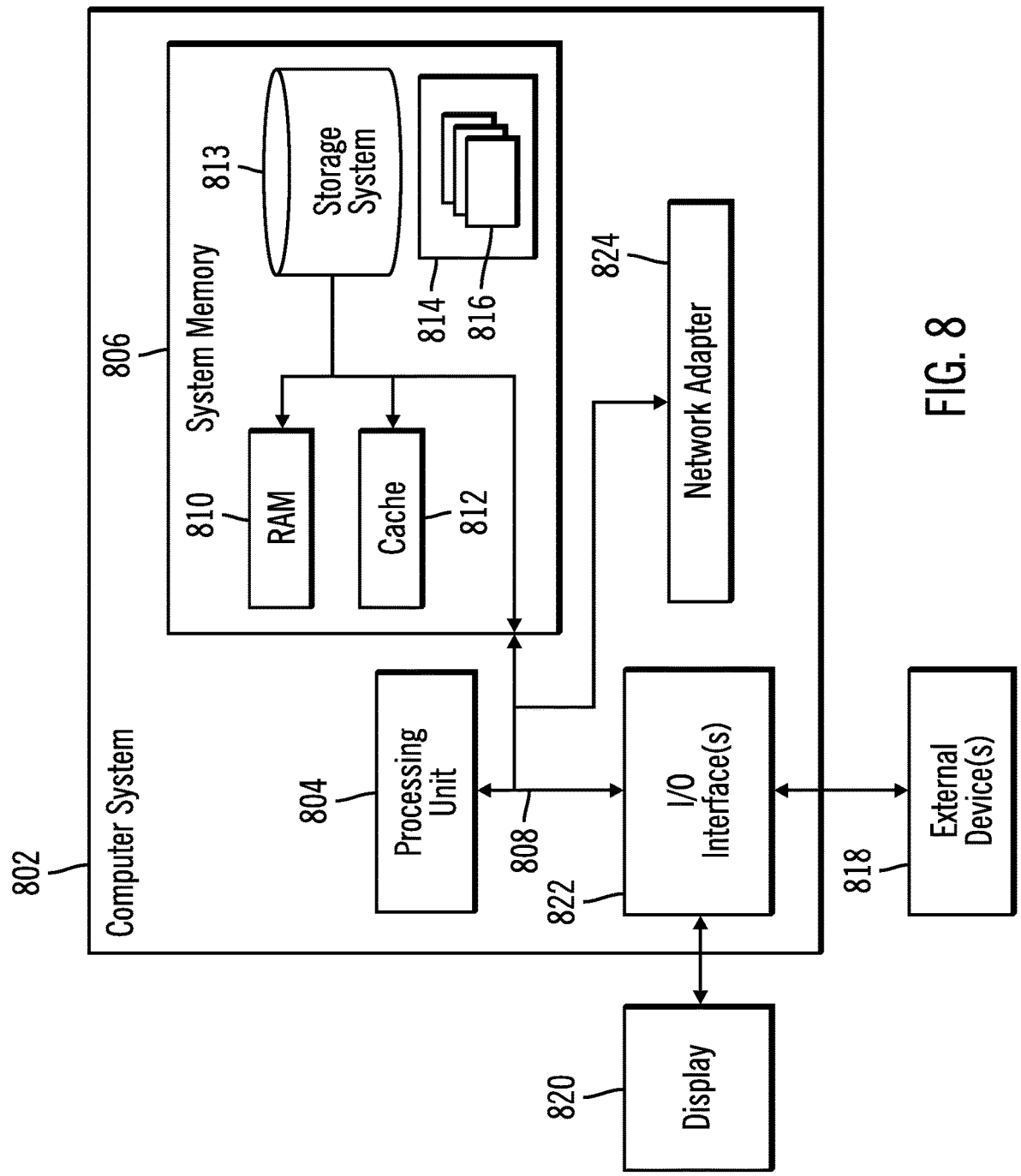
FIG. 8 illustrates a computing environment in which the components of FIG. 1 may be implemented.

The computational components of FIG. 1, including the storage servers 100 and storages $102_1 \ldots 102_n$, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for replicating a file to a remote storage in a network, comprising:
   providing a file, a unique identifier for the file, an indication of where the file was created, and a repository location indicating locations in remote storages where the file has been replicated;
   in response to determining that available remote storages do not satisfy both a geographical location requirement at which to replicate the file and a replication requirement indicating a minimum number of remote storages at which to replicate the file, performing:
      replicating the file to each available remote storage that satisfies the geographical location requirement;

determining a remaining number of replications comprising the minimum number of remote storages minus a number of available remote storages to which the file is replicated; and configuring at least one additional remote storage for the remaining number of replications to satisfy the geographical location requirement for replicating the file.

2. The method of claim 1, wherein the geographical location requirement is with respect to where the file was created.

3. The method of claim 2, wherein the determining that remote storages do not satisfy the both the geographical location requirement and the replication requirement comprises determining there are not the minimum number of remote storages within the geographical location requirement of where the file was created.

4. The method of claim 3, wherein, the geographical location requirement requires that the file cannot be replicated outside a jurisdictional boundary for a document class indicating the file includes at least one of personally identifiable information and sensitive personal information.

5. The method of claim 1, further comprising:

indicating the file in a replication queue to replicate the file to at least one remote storage that is available that satisfies the geographical location requirement until the remaining number of replications of the file is performed.

6. The method of claim 1, further comprising:

failing replication when a synchronous replication is specified and the available remote storages do not satisfy the geographical location and the replication requirements.

7. The method of claim 1, wherein the determining that available remote storages do not satisfy both the geographical location and the replication requirements is performed when an asynchronous replication is specified.

8. The method of claim 1, further comprising:

failing replication of the file in response to determining that no available remote storage satisfies the geographical location requirement.

9. The method of claim 1, wherein the geographical location requirement indicates at least one of a minimum number of geographical locations at which the file must be replicated and a geographical boundary of a jurisdictional entity within which the file must be replicated, wherein different geographical locations are separated by at least a disaster recovery distance providing a minimum distance between the different geographical locations that reduces likelihood that a disaster at one geographical location will occur at another of the geographical locations.

10. The method of claim 1, wherein one of the remote storages stores files in a file system and at least one of the remote storages stores files as an object for a cloud based object storage.

11. The method of claim 1, wherein the remote storages are organized in repositories, wherein the repositories include remote storages in different geographical locations, wherein a repository of the repositories is specified for the file to replicate, wherein the remote storages to which the file is replicated are in the repository specified for the file to replicate.

12. The method of claim 1, further comprising:

in response to determining that available remote storages satisfy both the geographical location requirement and the replication requirement, replicating the file to the minimum number of remote storages.

\* \* \* \* \*